T. E. LIVESEY.
Feather-Renovator.
No. 212,714. Patented Feb. 25, 1879.
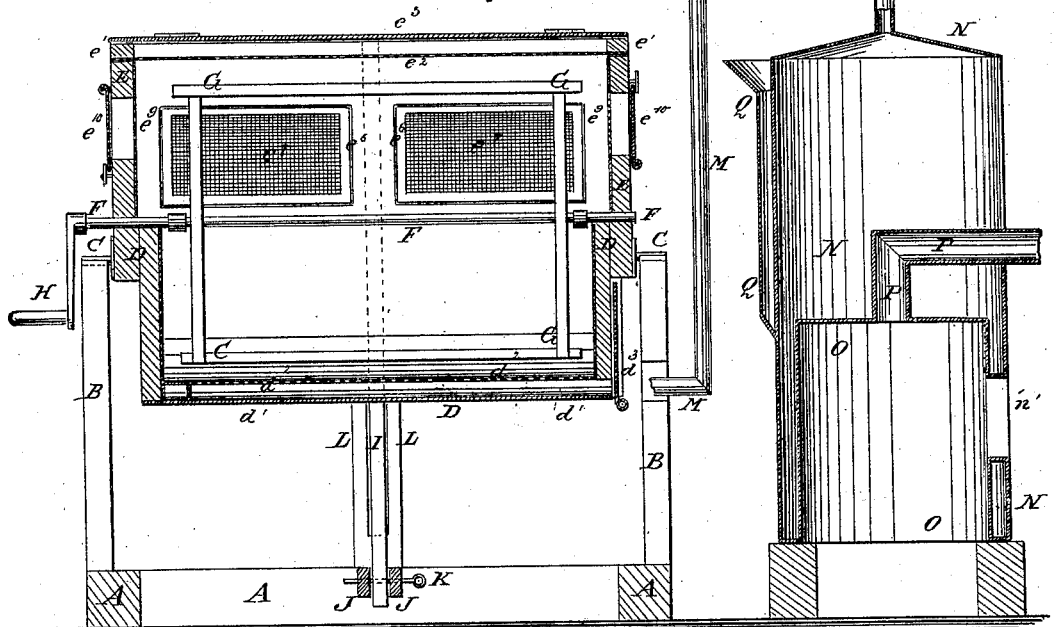
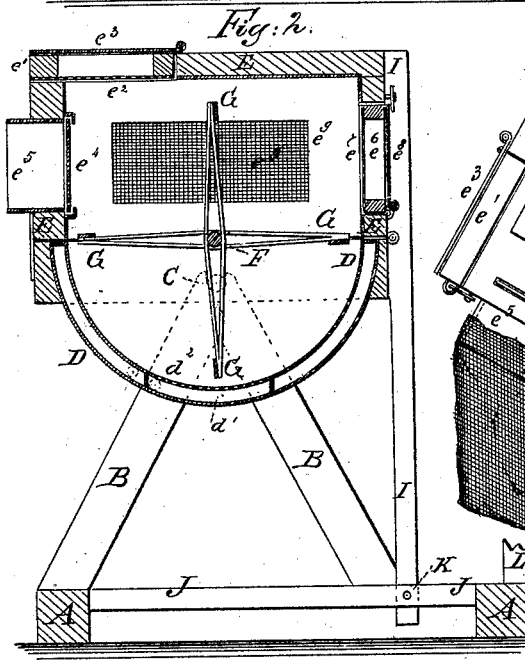
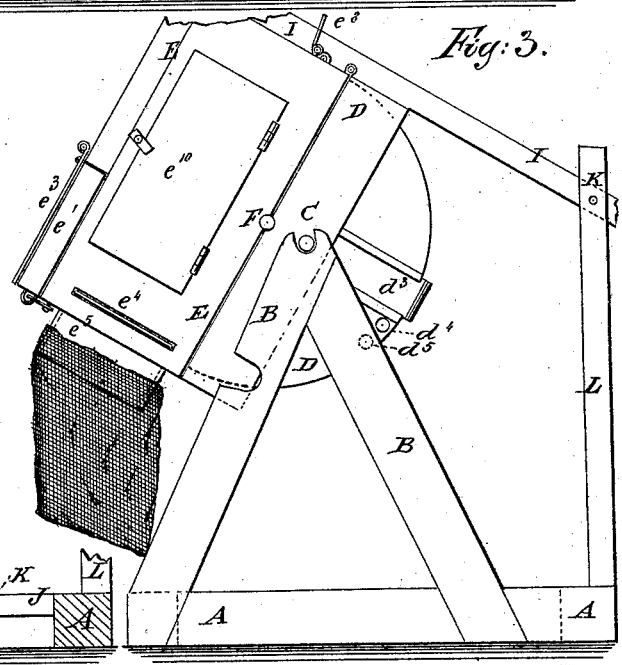
WITNESSES:
Chas. Nida
C. Sedgwick
INVENTOR:
T. E. Livesey
BY Munn & Co
ATTORNEYS.

UNITED STATES PATENT OFFICE.

THOMAS E. LIVESEY, OF ASHLEY, ILLINOIS, ASSIGNOR TO HIMSELF AND JAMES W. HUDSON, OF SAME PLACE.

IMPROVEMENT IN FEATHER-RENOVATORS.

Specification forming part of Letters Patent No. 212,714, dated February 25, 1879; application filed November 22, 1878.

*To all whom it may concern:*

Be it known that I, THOMAS EVAN LIVESEY, of Ashley, in the county of Washington and State of Illinois, have invented a new and useful Improvement in Feather-Renovators, of which the following is a specification:

Figure 1 is a vertical longitudinal section of my improved machine. Fig. 2 is a vertical cross-section of the same. Fig. 3 is an end view of the same, shown in position for discharging the feathers.

Similar letters of reference indicate corresponding parts.

The object of this invention is to furnish an improved machine for steaming and drying feathers to purify and renovate them, which shall be simple in construction, convenient in use, and effective in operation, doing its work thoroughly and quickly.

A is the base-frame of the machine, to the ends of which are attached two V-shaped frames, B, having notches or half-bearings in their angles to receive the gudgeons C, attached to the ends of the frame of the double-walled semi-cylindrical drum D. The double-walled drum D has a small chamber or pan, $d^1$, in its lower part, between the walls of the said drum, and the inner wall over the said pan is cut away and replaced by a wire-gauze or perforated sheet-metal screen, $d^2$, to allow the dust and other impurities from the feathers to settle into the pan $d^1$, and to distribute the steam evenly through all parts of the feathers. The spaces between the walls of the drum D, upon the opposite sides of the said drum, communicate with each other beneath the bottom of the pan $d^1$ or at its end. The pan $d^1$ is cleaned through an opening in the end of the drum D, which opening is closed by a slide, $d^3$. In the end of the drum D are formed two holes to receive steam-pipes—one, $d^4$, to introduce steam into the pan $d^4$ for steaming the feathers, and the other, $d^5$, for introducing steam into the space between the walls of the said drum D for drying the feathers. Upon the frame of the drum D is placed a rectangular box, E, which is hinged at its rear side to the said drum, and secured at its forward side by straps, hooks, or other convenient fastenings. The adjacent edges of the box E and drum D are notched to receive and form bearings for the journals of the shaft F. To the shaft F, within the box E and drum D, is attached a reel, G, by which the feathers are constantly agitated while being operated upon. One of the journals of the shaft F project, and has a crank, H, attached to it, by means of which it is rotated.

In the forward part of the top of the box E is formed a large opening, in which is hinged a frame, $e^1$. The frame $e^1$ has a wire-gauze screen, $e^2$, attached to its inner side, and to its outer side is hinged a covering-plate, $e^3$. In the forward side of the box E is formed a large opening, which is closed by a slide, $e^4$, and in which is secured a spout, $e^5$, to which the tick or sack is secured to receive the feathers when dry. In the rear side of the box E are formed openings, in which are hinged frames $e^6$, having wire-gauze screens $e^7$ attached to their inner sides, and plates $e^8$ hinged to their outer sides. In the ends of the box E are formed openings, in which are secured wire-gauze screens $e^9$, and which are closed by plates $e^{10}$, hinged to the said ends of the said box E.

To the center of the rear side of the box E is rigidly attached the upper part of a lever, I, the lower end of which enters the slot of a slotted bar, J, attached to the base-frame A, where it is secured in place by a pin, K, passed through it and through the said slotted bar J.

To the center of the rear bar of the base-frame A is rigidly attached the lower end of an upright bar, L, which is slotted longitudinally for the lower end of the lever I to pass through when the apparatus is tilted to discharge the feathers. The lower end of the lever I is secured to the slotted bar L by the pin K, to hold the apparatus securely in place while discharging the feathers.

In using the renovator, the feathers are introduced through the opening in the top of the box E, and steam is introduced into the pan $d^1$, and passes through the screen $d^2$ into the mass of feathers, the said feathers being constantly agitated by the revolution of the reel G.

When the feathers have been sufficiently steamed the steam is shut off and introduced into the space between the shells of the drum D, the covering-plates of the openings in the box E are turned back to allow the steam to escape, and the reel G is rotated until the feathers are thoroughly dried.

When the feathers are dry the apparatus is adjusted with the spout $e^5$ downward, the tick or sack to receive the feathers is attached to the said spout $e^5$, and the reel G is revolved, forcing the feathers into the said tick or sack.

M is the steam-pipe, the end of which is to be introduced into one or the other of the holes $d^4$ $d^5$, according as the feathers are to be steamed or dried. The other end of the steam-pipe M is connected with the top of the boiler N. The lower part of the boiler N is made with double walls, to form a fire-box, O, which is thus surrounded by the water-chamber. The boiler N is designed to be placed over a grate to allow the ashes to fall out, and fuel is introduced into the fire-chamber O through an opening through the double-walled lower part of the said boiler, which opening is closed by a door, $n'$.

The smoke and other products of combustion pass out through the smoke-pipe P, which passes through the top of the fire-chamber O, through the water-space in the boiler N, above the said fire-chamber, and out through the wall of the said boiler.

Q is the feed-pipe, which passes down along the side of the upper part of the boiler N, and enters the said boiler below low-water mark, and at or near the upper part of the fire-chamber O. The upper end of the pipe Q is made funnel-shaped for convenience in introducing the water.

Having thus described my invention, I claim as new and desire to secure by Letters Patent—

The combination of the rigid lever I and the slotted bars J L with the drum D, the box E, and the base-frame A, substantially as herein shown and described.

THOMAS EVAN LIVESEY.

Witnesses:
S. E. CATTERLIN,
GEO. L. COURTNEY.